United States Patent
Junig et al.

(10) Patent No.: US 8,057,342 B2
(45) Date of Patent: Nov. 15, 2011

(54) PLATE-LINK CHAIN FOR A MOTOR VEHICLE DRIVE SYSTEM

(75) Inventors: Marcus Junig, Bühlertal (DE); Anton Simonov, Bühl (DE); Olga Ispolatova, Bühl (DE); Michael Pichura, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 129 days.

(21) Appl. No.: 11/646,196

(22) Filed: Dec. 26, 2006

(65) Prior Publication Data

US 2007/0191165 A1 Aug. 16, 2007

Related U.S. Application Data

(60) Provisional application No. 60/755,822, filed on Jan. 3, 2006.

(30) Foreign Application Priority Data

Dec. 24, 2005 (DE) .......................... 10 2005 062 312

(51) Int. Cl.
*F16G 13/04* (2006.01)
(52) U.S. Cl. ........................................................ 474/215
(58) Field of Classification Search .................. 474/201, 474/214–245
See application file for complete search history.

(56) References Cited

U.S. PATENT DOCUMENTS

| 4,878,887 | A | * | 11/1989 | Sakakibara et al. | .......... 474/245 |
| 5,026,331 | A | * | 6/1991 | Sugimoto et al. | ............. 474/214 |
| 5,651,746 | A | | 7/1997 | Okuda | .......................... 474/215 |
| 2007/0010363 | A1 | * | 1/2007 | Pichura et al. | ................ 474/215 |

FOREIGN PATENT DOCUMENTS

| EP | 0741 255 A1 | 11/1996 |
| GB | 2 218 774 A | 11/1989 |
| GB | 2 231 934 A | 11/1990 |

* cited by examiner

*Primary Examiner* — Robert Siconolfi
*Assistant Examiner* — Anna Momper
(74) *Attorney, Agent, or Firm* — Alfred J. Mangels

(57) ABSTRACT

A plate-link chain for a motor vehicle drive system. The chain includes a plurality of link plates hingedly connected with each other by rocker members that extend transversely to the longitudinal direction of the plate-link chain and are positioned in openings of the link plates. The rocker members and link plates each have curved contact surfaces. The rocker members also have curved rolling surfaces along which the rocker members roll against each other. The rocker members are shaped asymmetrically in the height direction, and the contact surfaces are provided on upper and lower contact surface regions. The rocker members also have at least two regions with different curvatures in the regions of their rolling surfaces.

13 Claims, 5 Drawing Sheets

PLATE-LINK CHAIN FOR A MOTOR VEHICLE DRIVE SYSTEM

BACKGROUND OF THE INVENTION

1. Field of the Invention

The present invention relates to a plate-link chain, in particular for a motor vehicle drive system. The chain includes a large number of link plates hingedly connected with each other by rocker members, wherein the rocker members run transversely to the longitudinal direction of the plate-link chain and are positioned in openings in the link plates. There are curve-shaped contact surfaces located on each of the rocker members and link plates, along which contact surfaces the rocker members and link plates are in contact with each other to transmit power. There also are curve-shaped rolling surfaces on the rocker members, along which the rocker members roll on each other to transfer power. The rocker members are shaped asymmetrically in the height direction of the rocker members, viewed in a cross section running in the longitudinal direction of the plate-link chain, and the contact surfaces between rocker member and link plate are provided on upper and lower contact surface regions in the height direction of the rocker member.

2. Description of the Related Art

A plate-link chain of the type described above can be employed in a vehicle drive system. When used in a continuously variable, belt-driven conical disk transmission (CVT) as part of the vehicle transmission, the rocker members have specially shaped faces by which the tractive force is transmitted between the conical disks and the plate-link chain as a frictional force. In many other applications in vehicle drive systems the plate-link chain is a toothed chain, so that it has teeth on at least one edge, by which the tractive force is transmitted between the chain and toothed wheels. Such a plate-link chain in the form of a toothed chain can be employed in a distributor gear unit of an all-wheel-drive motor vehicle, for example, or also for bridging center distances to a differential, or also as a power transmission means in a secondary drive or for an auxiliary unit of the motor vehicle, for example.

The plate-link chain is made up in that case of a large number of link plates that are hingedly connected with each other by rocker members. The link plates can be arranged in the form of plate sets in such a manner that a plurality of link plates bounding on and adjacent to each other are penetrated by the rocker members, so that a plate-link chain results that can transmit large forces when it is under tension.

Such a plate-link chain has become known on the basis of U.S. Pat. No. 5,651,746, for example. That known plate-link chain has rocker members that rest against each other on rolling surfaces to transfer force. The radius on which those rolling surfaces are based is designated as optimal within a spacing-dependent window. The intended object of that is that the known plate-link chain will not suffer any lasting prior damage in the region of the rolling surfaces during preloading. If a tensile force is transmitted with that known plate-link chain, then the geometry of the rolling surfaces of the rocker members can result in an unfavorable distribution of forces in the region of the contact surfaces of the rocker members and the link plates, which increases the danger of the rocker members twisting in the openings of the link plates, thus resulting in stress peaks that promote premature failure of the plate-link chain.

Therefore, an object of the present invention is to provide a plate-link chain with which there is more favorable distribution of forces in the region of the contact surfaces of the rocker members and the link plates, so that the described problem is eliminated.

SUMMARY OF THE INVENTION

The present invention provides a plate-link chain, particularly for a motor vehicle drive system and with a large number of link plates hingedly connected with each other by rocker members. The rocker members extend transversely to the longitudinal direction of the plate-link chain, and they are positioned in openings of the link plates. Curve-shaped contact surfaces are located on each of the rocker members and the link plates, along which contact surfaces the rocker members and the link plates are in contact with each other to transmit power. Curve-shaped rolling surfaces are provided on the rocker members, along which the rocker members roll against each other to transmit power. The rocker members are shaped asymmetrically in the height direction of the rocker members, viewed in a cross section extending in the longitudinal direction of the plate-link chain, and the contact surfaces are provided on the upper and lower contact surface regions, in the height direction of the rocker member, between rocker member and link plate, wherein the rocker members have at least two regions with different curvatures in the region of the rolling surfaces.

A plate-link chain of the type under discussion here has, in the longitudinally extending load strand, a contact region between the rocker members that differs from the contact region in the case of bending, i.e., when the plate-link chain undergoes a change of direction when it passes over a sprocket wheel or around a pulley. The contact region between the pressure pieces or rocker members is below an imaginary line that bisects the rolling surface in the height direction of the rocker member when the load strand is extended, and above that line in the case of bending of the chain. The present invention makes advantageous use of that knowledge, and it provides rolling surfaces with at least two regions having different curvatures. That enables the rolling motion of the rocker members on each other to be optimized by adjusting the curvatures in the region of the rolling surfaces, for example in terms of reducing the surface pressure in the region of the contact surfaces of the rocker members, and accordingly reducing the wear at the contact points of the rocker members.

The invention can be further refined by having the curvature remain the same within each of the at least two regions, so that the radii of curvature of the two regions differ, for example, but within each region the radius of curvature remains the same.

In accordance with an additional modification, provision is made so that within at least one region a curvature that changes along the rolling surface is provided. Hence at least two regions are provided with a different curvature from one region to the other, and in at least one of the regions the curvature can also change along the rolling surface, i.e., it can be variable along the rolling surface, for example. If the same curvatures are provided in the boundary surface region between the at least two regions, which must be regarded as infinitesimal, and if the curvature changes along the rolling surfaces of the at least two regions, then that also includes an arrangement of the rolling surfaces of the rocker members that is of variable design along the entire rolling surface and is therefore determined for example by means of a mathematical function as the generating function.

Very generally, the invention provides that the curvature in the region of the second contact region of two adjacent rocker members which arises in the straight strand of the plate-link chain under tension, is smaller than in the region of the first contact region of the adjacent rocker members that arises in the case of bending of the chain. If the plate-link chain in accordance with the invention circulates between the two reversal points that are formed at two toothed wheels, or two pairs of conical disks in a belt-driven conical-pulley transmission, for example, then a contact region arises in the plate-link chain in accordance with the invention between the rocker members below the imaginary center line described above. The plate-link chain in accordance with the invention is then distinguished by the fact that the curvature is smaller in that second contact region than in the first contact region of the rocker members in the case of bending of the chain, which is above the imaginary centerline referred to earlier. If both regions are formed by means of radii that differ from each other, then the radius in the first or upper contact region is smaller than in the second, lower contact region. Even if the rolling surfaces are formed with a radius that is variable over the entire length of the arc, the invention includes the provision that the radius is larger in the second contact region than in the first contact region.

The curvature in the second contact region is chosen in accordance with the invention so that the contact point or contact region between two adjacent rocker members, in the height direction of the rocker members, is shifted in the direction of the center of the rocker member height. What that accomplishes is that the transmission of pressure force between the two rocker members in the straight strand of the plate-link chain runs so that the reaction forces arising at the respective contact surfaces of the rocker members and link plates are distributed quite evenly on the lower contact surface and the upper contact surface. There is no clearly unequal distribution, as is the case with the known plate-link chain, because such an unequal distribution results in a tendency of the rocker member to twist in the link plate opening.

The invention also includes the provision that the curvature in the first contact region, i.e., the upper contact region, is chosen so that the contact point or contact region between two adjacent rocker members in the height direction of the rocker members is also shifted in the direction of the middle of the rocker member height. The result is that the contact region for transmitting force between the two rocker members is also between the upper and lower contact surfaces of the rocker members or link plates in the case of bending of the chain. Hence, on the one hand the tendency of the rocker members to twist in the opening of the link plates is countered, and on the other hand a more even distribution of forces between the upper and the lower contact surfaces is achieved.

The invention can now be further refined by having the ratio of the curvature of the second contact region to that of the first contact region be in the range of from about 0.25 to about 0.9, preferably from about 0.25 to about 0.83.

Thus, the curvature of the first contact region can range from about 1.2 times to 4 times the curvature of the second contact region, whose curvature is smaller in any case than the curvature of the first contact region. A ratio of curvature recognized as advantageous lies in the region of about 0.5, so that the curvature of the second contact region is half the curvature of the first contact region. In another preferred embodiment the ratio of the curvature of the second contact region to the curvature of the first contact region is from about 7 to about 16.

Quite generally, the curvature in the second contact region is chosen so that the distribution of forces that occur in the region of the contact surfaces of the rocker member and the link plate acts against the tendency of the rocker member to twist relative to the link plate.

The rolling surfaces of the rocker members have at least two regions with different curvatures and each have a certain arc length along the rolling surface. The invention provides that the ratio of the arc length of the region with lesser curvature, i.e., the second contact region, to the region with greater curvature, i.e., the first contact region, is from about 1 to about 2. That makes it possible to take account of the need for the plate-link chain to have a large angle of bend when reversing the running direction on a toothed wheel or a pulley.

In the upper rolling surface region the rolling surface forms an upper beginning of the first contact region, viewed in the height direction of the rocker member, and in the lower rolling surface region also a lower beginning of the second contact surface region, viewed in the height direction of the rocker member. If both contact surface region beginnings are now connected with an imaginary straight line, and if a perpendicular is drawn to the middle of that straight line, the invention provides that a center point of at least one of the circular arc segments lies outside of the perpendicular line drawn through the center of that connection section of the end points of the regions of the rolling surface, in particular outside of that perpendicular line in the height direction of the rocker member.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
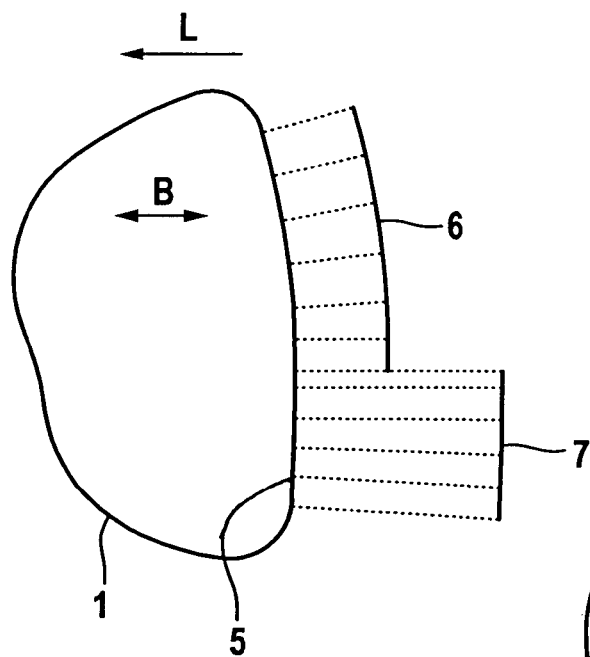
FIG. 1 is an end view of a schematically shown rocker member in accordance with an embodiment of a plate-link chain in accordance with the present invention.

FIG. 1 shows an end view of a rocker member 1 of a plate-link chain 2 (shown in FIG. 3) in accordance with the present invention.

As can be clearly seen, rocker member 1 is of asymmetrical design in the height direction of the rocker member, i.e., in the upper region it has a greater width in the width direction (double headed arrow B), which is also the running direction (arrow L) of plate-link chain 2. When installed as shown in FIG. 3, i.e., when the rocker member is positioned together with another rocker member in an opening 3 of a link plate 4, another rocker member 13 is positioned opposite that rocker member 1, so that both rocker members roll against each other on a curved rolling surface 5.

Figure 3:
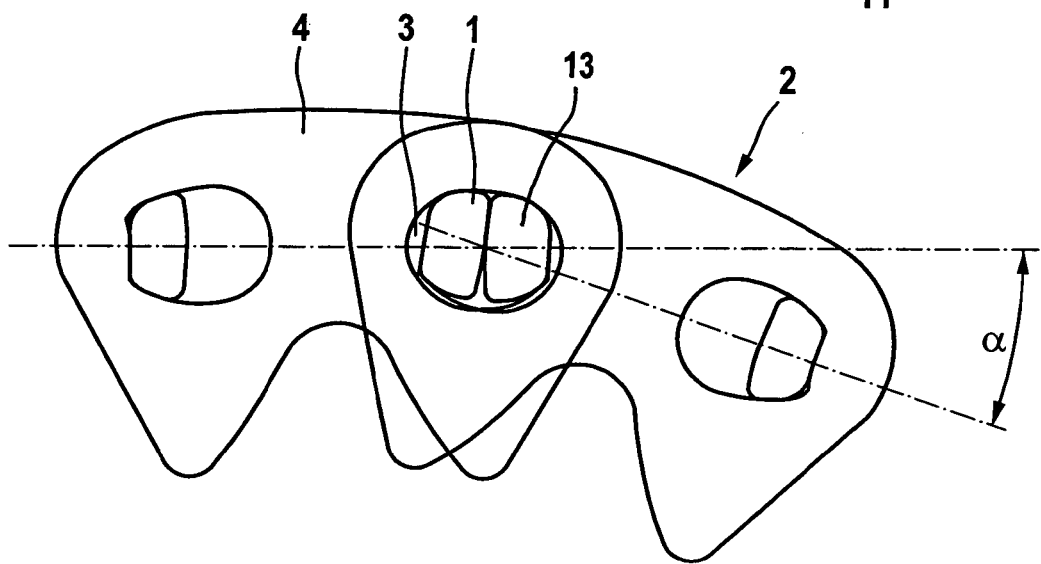
FIG. 3 is a side view of a portion of a plate-link chain in accordance with the present invention.

Rocker member 1 has a first contact region 6, which is established when rocker member 1 together with the rocker member 13 in the opposite position roll against each other during bending, that instance of bending being shown in FIG. 3 of the drawing, for example. In addition, rolling surface 5 of rocker member 1 has a second contact region 7, at which the two rocker members roll on each other when the straight strand of the plate-link chain is under tension.

Figure 9:
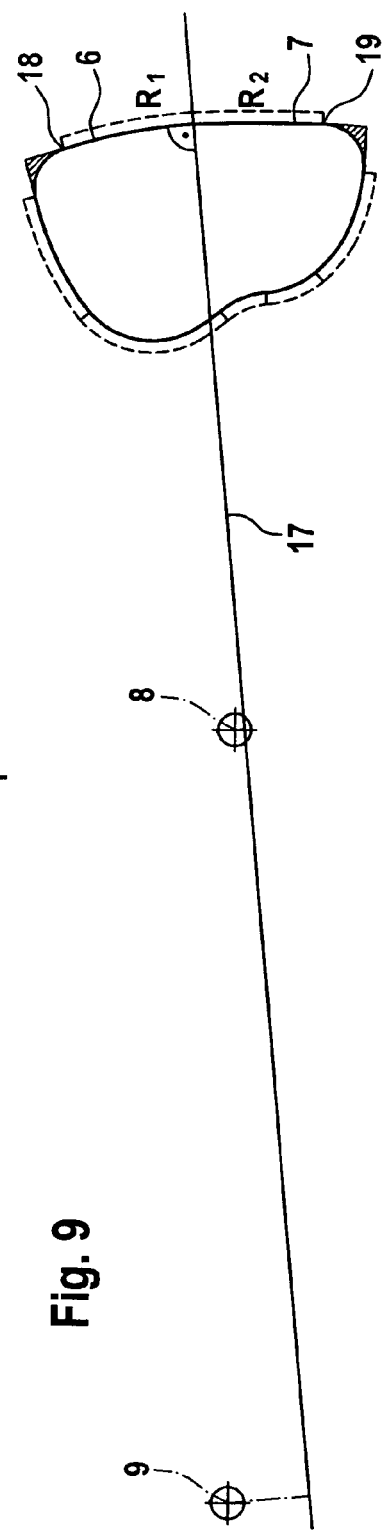
FIG. 9 is a view to explain geometric circumstances.

The dotted lines shown in FIG. 1 of the drawing in the first contact region 6 represent the length of the radius starting from the center point 8 shown in FIG. 9 of the drawing, starting from which the first contact region 6 is formed, that radius being designated in FIG. 9 by $R_1$. In a similar way, the lines shown as dotted lines in FIG. 1 in the second contact region 7 represent the length of the radius with which the rolling surface 5 is formed in the second contact region 7, and which starts from the center point designated as 9 in FIG. 9 and is represented in FIG. 9 as $R_2$. As can be clearly seen on the basis of FIGS. 1 and 9 of the drawings, radius $R_2$ is greater than radius $R_1$, so that the curvature of the rolling surface in the region of the second contact region 7 is smaller than the curvature of rolling surface 5 in the first contact region 6.

Figure 2:
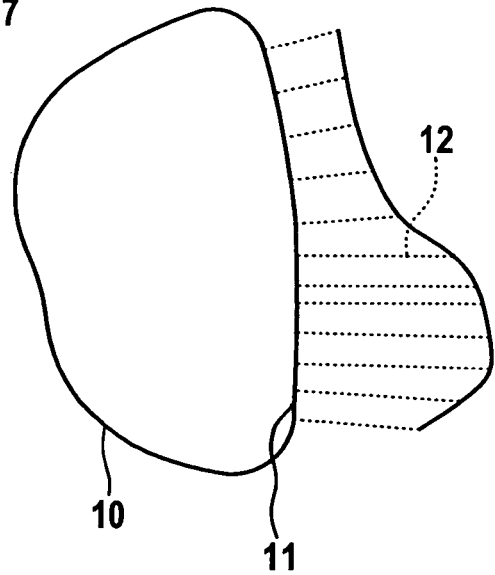
FIG. 2 is an end view of a rocker member in accordance with a modified embodiment of the plate-link chain.

FIG. 2 of the drawings shows a rocker member 10 in accordance with a modified embodiment of a plate-link chain, whose rolling surface 11 has a radius that changes constantly over the entire length of the arc, that being shown again in FIG. 2 on the basis of the dotted lines 12, whose envelope curve is shown as a continuous line.

Figure 4:
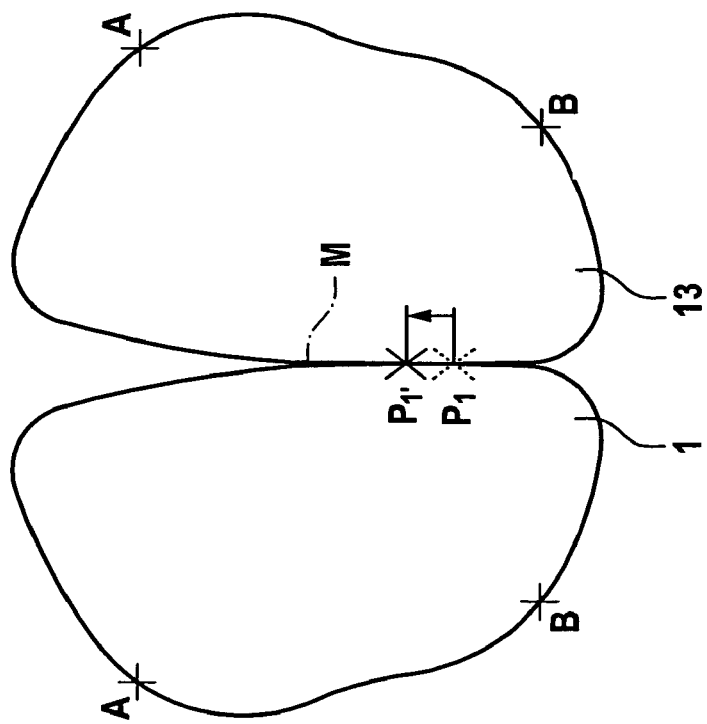
FIG. 4 is an end view of a pair of rocker members of a plate-link chain in accordance with the present invention, to explain a shift of a contact surface region.

FIG. 4 of the drawings shows a pair of rocker members in an end view to illustrate a shift of the contact point or contact surface region between rocker members 1 and 13 from point $P_1$ to point $P_{1'}$. Here point $P_1$ is the contact region that would occur in the case of a known plate-link chain and which is shown for illustrative purposes, while point $P_{1'}$ is the contact surface region that occurs with the plate-link chain in accordance with the present invention, namely in the straight strand of the plate-link chain. As can clearly be seen, the contact surface region has been shifted further in the direction of a rocker member height center M.

Figure 5:
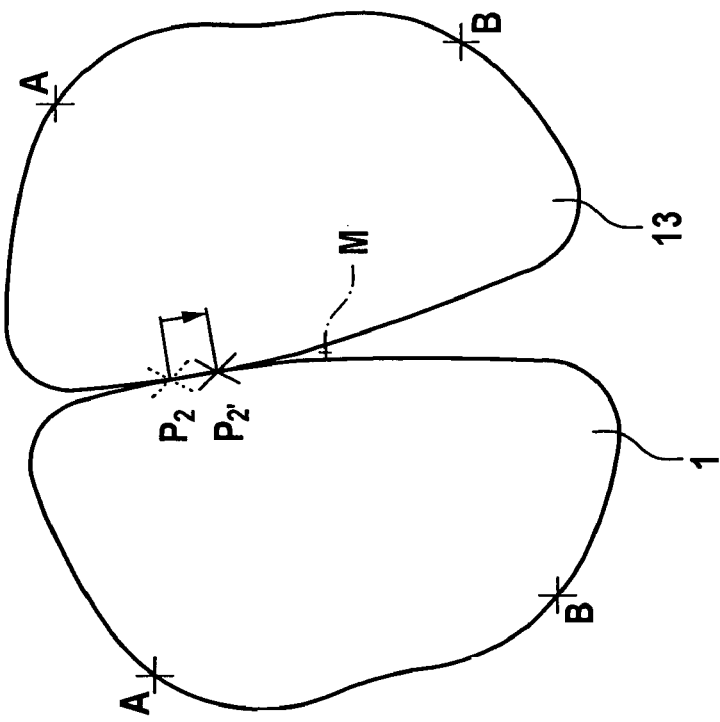
FIG. 5 is an end view similar to that of FIG. 4.

In a similar manner, FIG. 5 shows a representation of the pair of rocker members with a contact surface region at point $P_2$, which corresponds to the position of a contact surface region in a known plate-link chain, and which has been shown for illustrative purposes, namely in the bent case shown in FIG. 3, whereas point $P_{2'}$ represents the position of the contact surface region in the described load case for the plate-link chain in accordance with the invention. As can be clearly seen, in that load case as well the contact surface region has been shifted between the two rocker members 1, 13 in the direction of the rocker member height center M.

Figure 6:
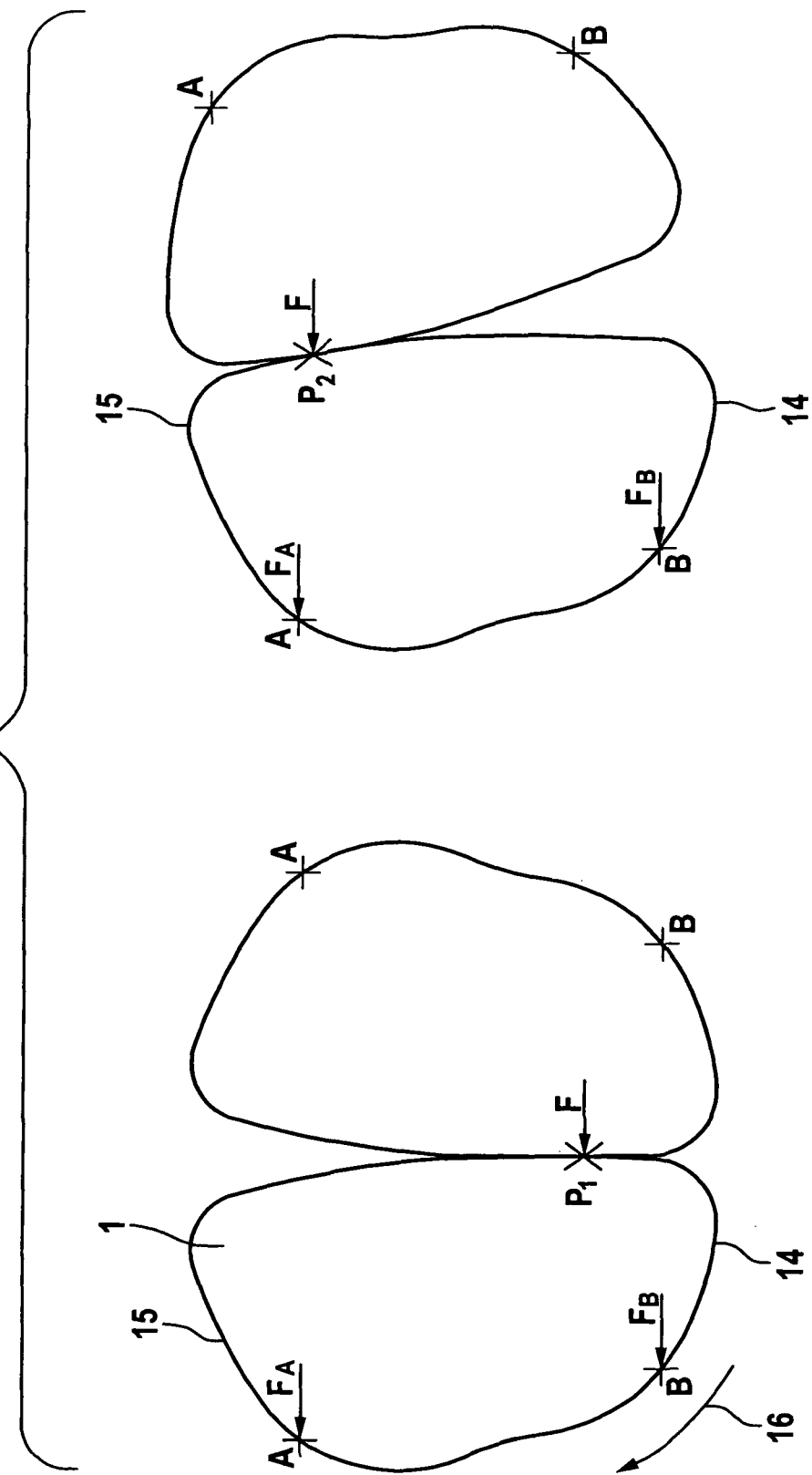
FIG. 6 shows two end views to illustrate the distribution of contact forces under load in a known plate-link chain.
Figure 7:
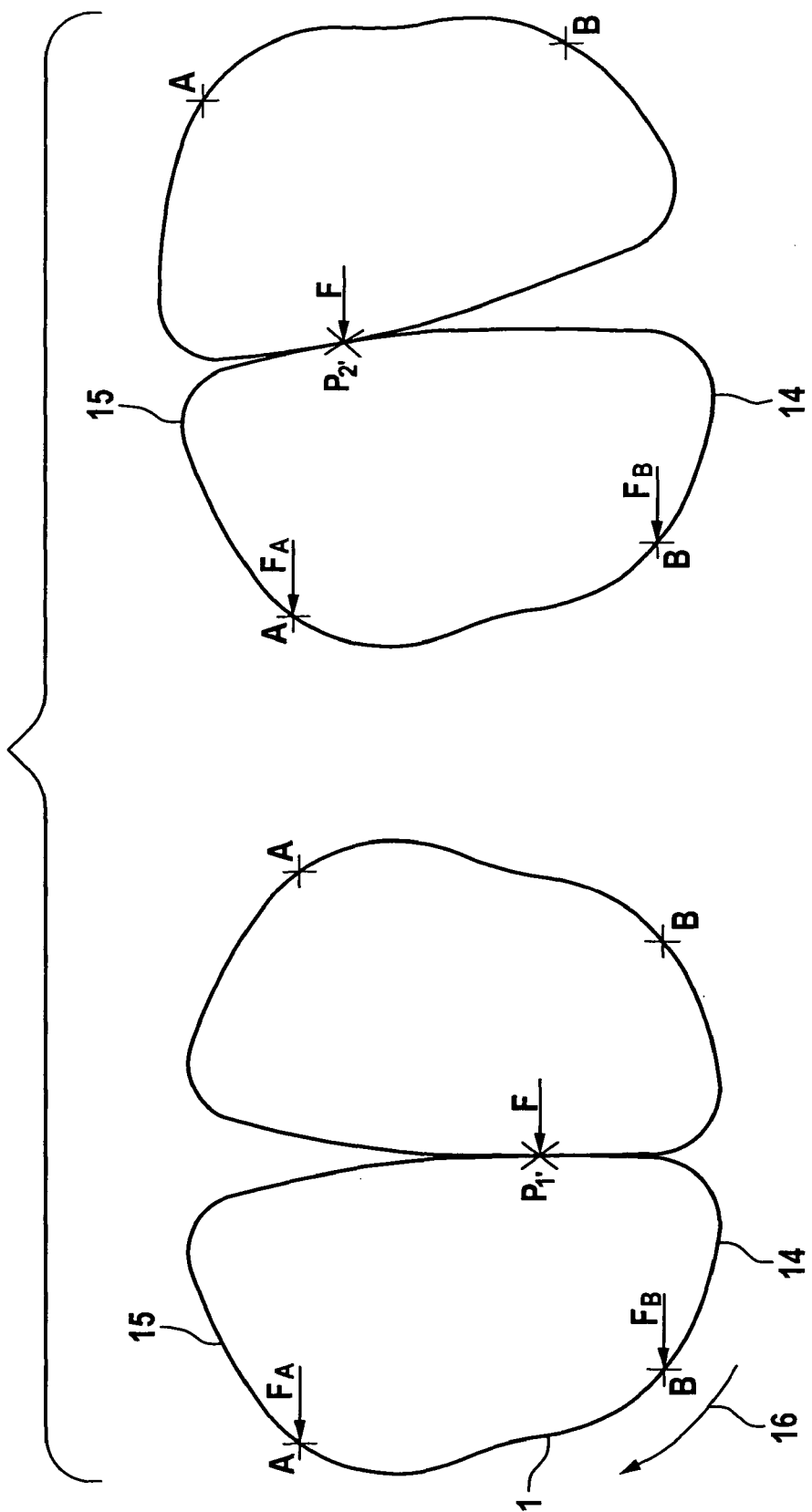
FIG. 7 shows end views similar to those of FIG. 6 to illustrate the distribution of contact forces in a plate-link chain in accordance with the present invention.

The effect of that shift is now visible on the basis of FIGS. 6 and 7 of the drawings.

FIG. 6 of the drawings shows in the left half of the drawing the distribution of forces in the straight strand of a known plate-link chain, wherein the force F imposed at point $P_1$ is divided into the force $F_B$ acting on a lower contact surface 14 at point B, which is greater than the force $F_A$ acting on the upper contact surface 15 at point A. Therefore, because of the unequal distribution of forces a tendency exists, indicated by arrow 16, for rocker member 1 to twist in opening 3 of plate-link chain 4 (see FIG. 3). In a similar manner, FIG. 6 shows in the right half of the drawing the distribution of forces in the bending load case, so that the force F at point $P_2$ is divided into force components $F_B$ and $F_A$ that are very unevenly distributed in terms of magnitude, namely in the lower contact surface 14 and the upper contact surface 15.

FIG. 7 shows, in the left half of the drawing, the loading conditions for a plate-link chain constructed in accordance with the invention, a view similar to the left half of the drawing in FIG. 6. As can clearly be seen, the shift of the force application point in the direction of the rocker member height center from $P_1$ as shown in FIG. 6, to $P_{1'}$, as shown in FIG. 7, results in a significant change from the uneven distribution of the reaction forces $F_B$ and $F_A$ in FIG. 6 to forces of approximately equal magnitude in FIG. 7. In addition, the tendency of rocker member 1 to twist in opening 3 of link plate 4, expressed by the length of arrow 16, decreases significantly.

FIG. 7 shows, in the right half of the drawing, the load case corresponding to the right half of the drawing in FIG. 6, where because of the shift of contact surface region $P_2$ to $P_{2'}$ in the direction of the rocker member height center, the resulting reaction forces $F_A$ and $F_B$ are substantially less different than in the right half of the drawing in FIG. 6. Accordingly, the component stresses that arise in the link plate also decrease correspondingly, and thus the risk of crack formation in the link plate is reduced.

Figure 8:
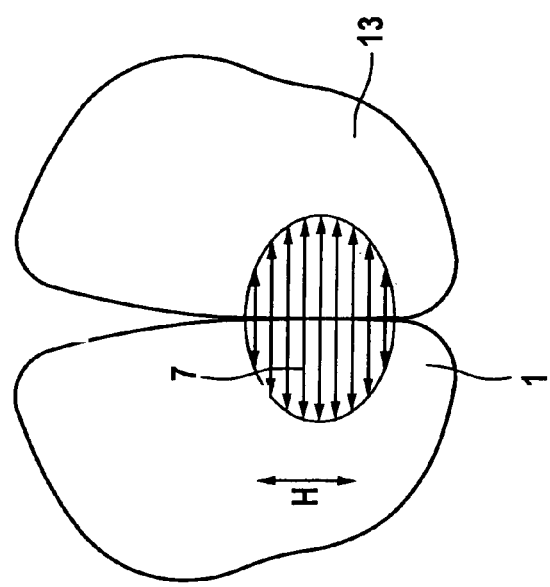
FIG. 8 is an end view of a pair of rocker members to illustrate the distribution of surface contact pressures occurring under load.

FIG. 8 of the drawing shows a qualitative progression of the surface pressure in the second contact region 7 of a rocker member pair 1, 13 of a plate-link chain 2 in accordance with the invention. That Figure makes it absolutely clear that because of the smaller curvature in the region of the second contact region 7 the result is a surface pressure distribution that is more uniform in form because of the small curvature, and does not correspond, for example, to a lens compressed in the height direction (double headed arrow H), as is the case with known plate-link chains.

FIG. 9 of the drawings shows further that the center points 8, 9 of the radii that serve to form the first contact region 6 and the second contact region 7, respectively, lie above a perpendicular line 17 that divides the connection section between the beginning 18 of the first contact region 6 and the beginning 19 of the second contact region 7, each center point lying outside when viewed in the rocker member height direction H, at the perpendicular center. The extent of the length of first contact region 6, i.e., the arc length along the rolling surface 5, has approximately twice the arc length of the rolling surface 5 in the region of the second contact region 7.

With the plate-link chain in accordance with the invention a much more uniform distribution of forces between the contact surfaces of the rocker members and the link plate is therefore achieved, so that the risk of stress cracks on the link plate is correspondingly reduced. The different curvatures in the region of the rolling surfaces of the rocker members also provide for the different load cases in the straight strand of the plate-link chain and in the bent case.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain for a motor vehicle drive system, said chain comprising: a plurality of link plates hingedly connected with each other by rocker members, wherein the rocker members extend transversely to the longitudinal direction of the plate-link chain and are positioned in openings in the link plates, the chain including an outer surface that faces radially outwardly when the chain moves in a circular path about an axis of rotation and an inner surface that faces radially inwardly when the chain moves in a circular path about an axis of rotation, curved contact surfaces located on the rocker members and on the link plates and along which the rocker members and link plates are in contact with each other to transmit power, curved rolling surfaces located on the rocker members and along which pairs of the rocker members roll against each other to transmit power, wherein the rocker members are shaped asymmetrically in cross section in a height direction of the rocker members that is perpendicular to the longitudinal direction of the plate-link chain relative to a longitudinal plane that is parallel to the longitudinal direction of the chain when the chain is in a straight condition and that passes through a center region of the rocker member cross section, wherein the rocker members have a rocker member outer width region having an outer width dimension between the longitudinal plane and the chain outer surface that is larger than a rocker member inner width region having an inner width dimension between the longitudinal plane and the chain inner surface, wherein the contact surfaces between the rocker members and the link plate openings each have outer and inner contact surface regions relative to the longitudinal plane and in the height direction of the rocker members, wherein the curved rolling surfaces of the rocker members include at least two rocker-member-to-rocker-member contact regions, an outer contact region above the longitudinal plane and an inner contact region below the longitudinal plane, each rocker-member-to-rocker-member contact region considered relative to the longitudinal plane that passes through the rocker member center regions when the chain is in a straight condition, the outer and inner rocker-member-to-rocker-member contact regions having different curvatures in the outer and inner contact regions of their rolling surfaces, and wherein a ratio of the curvature of the inner contact region to the outer contact region lies in the range of from about 0.25 to about 0.9.

2. A plate-link chain in accordance with claim 1, wherein within the at least two rocker-member-to-rocker-member contact regions having different curvatures of the rocker-member-to-rocker member rolling surfaces the curvatures are constant.

3. A plate-link chain in accordance with claim 1, wherein within at least one of the contact regions of the rocker-member-to-rocker-member rolling surfaces the curvature varies along the rolling surfaces.

4. A plate-link chain in accordance with claim 1, wherein the curvature in inner contact regions of the rocker-member-to-rocker member rolling surfaces of two adjacent rocker members when contact between the rocker members occurs when the plate-link chain is straight and under tension, is smaller than the curvature in outer contact regions of the adjacent rocker members which come into contact when the chain bends about an axis perpendicular to the chain longitudinal direction.

5. A plate-link chain in accordance with claim 4, wherein the curvature in the inner rocker-member-to-rocker-member contact region is selected so that a contact point between two adjacent rocker members in the height direction of the rocker members is shifted in a direction toward the center of the rocker member height from a first point located inwardly of a rocker member center point to a second point that is closer to the center point than the first point.

6. A plate-link chain in accordance with claim 5, wherein the curvature in the inner rocker-member-to-rocker-member contact region is selected so that a distribution of forces that occur in the region of the contact surfaces of the rocker member and of the link plate opening operates to counteract twisting of the rocker member relative to the plate-link chain.

7. A plate-link chain in accordance with claim 4, wherein the curvature in the outer rocker-member-to-rocker-member contact region is selected so that a contact point between two adjacent rocker members in the height direction of the rocker members is shifted in a direction toward the center of the rocker member height from a first point located outwardly of a rocker member center point to a second point that is closer to the center point than the first point.

8. A plate-link chain in accordance with claim 4, wherein the ratio of the curvature of the inner rocker-member-to-rocker-member contact region to the outer rocker-member-to-rocker-member contact region is about 0.5.

9. A plate-link chain in accordance with claim 4, wherein the ratio of the curvatures of the inner rocker member-to-rocker member contact region to the outer rocker member-to-rocker member contact region lies in the range of from about 0.25 to about 0.83.

10. A plate-link chain in accordance with claim 4, wherein the ratio of the curvatures of the inner rocker-member-to-rocker-member contact region to the outer rocker-member-to-rocker-member contact region is from about 7 to about 16.

11. A plate-link chain in accordance with claim 1, wherein the contact regions along the rolling surfaces of the rocker members each have an arc length, and the ratio of the arc length of the region with lower curvature to the arc length of the region with higher curvature is from about 1 to about 2.

12. A plate-link chain in accordance with claim 1, wherein at least one rolling surface region is a circular arc segment whose center point, in a direction relative to the chain outer surface, lies outwardly of a perpendicular line drawn to a center of a connection section connecting outwardly-lying beginnings of the contact regions on the rolling surface of a rocker member.

13. A plate-link chain for a motor vehicle drive system, said chain comprising: a plurality of link plates hingedly connected with each other by rocker members, wherein the rocker members extend transversely to the longitudinal direction of the plate-link chain and are positioned in openings in the link plates, the chain including an outer surface that faces radially outwardly when the chain moves in a circular path about an axis of rotation and an inner surface that faces radially inwardly when the chain moves in a circular path about an axis of rotation, curved contact surfaces located on the rocker members and on the link plate openings and along which the rocker members and link plates are in contact with each other to transmit power, curved rolling surfaces located on the rocker members and along which pairs of the rocker members roll against each other to transmit power, wherein the rocker members are shaped asymmetrically in cross section in a height direction of the rocker members that is perpendicular to the longitudinal direction of the plate-link chain, wherein relative to a longitudinal plane that is parallel to the longitudinal direction of the chain when the chain is in a straight condition and that passes through a center region of the rocker member cross section the rocker members have a rocker member outer width region having an outer width dimension between the longitudinal plane and the chain outer surface that is larger than a rocker member inner width region having an inner width dimension between the longitudinal plane and the chain inner surface, wherein the contact surfaces between the rocker members and the link plate openings each have outer and inner contact surface regions relative to the longitudinal plane and in the height direction of the rocker members, wherein the curved rolling surfaces of the rocker members include at least two rocker-member-to-rocker-member contact regions, an outer contact region above the longitudinal plane and an inner contact region below the longitudinal plane, each rocker-member-to-rocker-member contact region considered relative to the longitudinal plane that passes through the rocker member center regions when the chain is in a straight condition, wherein the rocker members of a rocker member pair include at least two contact regions having different curvatures in the regions of their rolling surfaces, wherein an inner rocker-member-to-rocker-member contact surface region lies below a line that passes through rocker member centers when the chain is in a curved condition and an outer rocker-member-to-rocker-member contact surface region lies above the line that passes through rocker member centers when the chain is in a curved condition as the chain moves in a circular path about an axis of rotation, and wherein the inner rocker-member-to-rocker-member contact surface region has a first radius of curvature and the outer rocker-member-to-rocker-member contact surface region has a second radius of curvature, and wherein the first radius of curvature is greater than the second radius of curvature.

* * * * *